US011225931B2

United States Patent
Dury et al.

(10) Patent No.: US 11,225,931 B2
(45) Date of Patent: Jan. 18, 2022

(54) PISTON FOR INTERNAL COMBUSTION ENGINE HAVING A TARGET, AND INTERNAL COMBUSTION ENGINE COMPRISING SUCH A PISTON

(71) Applicant: MCE 5 Development, Villeurbanne (FR)

(72) Inventors: Philippe Dury, Miribel (FR); Yves Miehe, Lyons (FR)

(73) Assignee: MCE 5 Development, Villeurbanne (FR)

( * ) Notice: Subject to any disclaimer, the term of this patent is extended or adjusted under 35 U.S.C. 154(b) by 62 days.

(21) Appl. No.: 16/616,893

(22) PCT Filed: May 28, 2018

(86) PCT No.: PCT/FR2018/051238
§ 371 (c)(1),
(2) Date: Nov. 25, 2019

(87) PCT Pub. No.: WO2018/220321
PCT Pub. Date: Dec. 6, 2018

(65) Prior Publication Data
US 2021/0010443 A1 Jan. 14, 2021

(30) Foreign Application Priority Data
May 29, 2017 (FR) ...................................... 1754682

(51) Int. Cl.
*F02F 3/00* (2006.01)
*F02D 15/00* (2006.01)
(Continued)

(52) U.S. Cl.
CPC ............ *F02F 3/0069* (2013.01); *F02D 15/00* (2013.01); *F16J 1/04* (2013.01); *F16J 1/16* (2013.01); *G01D 5/145* (2013.01)

(58) Field of Classification Search
CPC .. F02F 3/0069; F02F 3/00; F02D 15/00; F16J 1/04; F16J 1/16; G01D 5/145
See application file for complete search history.

(56) References Cited

U.S. PATENT DOCUMENTS 4,407,155 A * 10/1983 Sundeen ............... F02D 41/009
73/114.28
8,065,909 B2 * 11/2011 Rabhi ..................... F02D 15/02
73/114.16

FOREIGN PATENT DOCUMENTS

DE  102009013323 A9  3/2011
DE  102015217152     2/2017
(Continued)

OTHER PUBLICATIONS

International Search Report for International Application No. PCT/FR2018/051238 dated Aug. 24, 2018, 3 pages.
(Continued)

*Primary Examiner* — Jacob M Amick
*Assistant Examiner* — Charles J Brauch
(74) *Attorney, Agent, or Firm* — TraskBritt

(57) ABSTRACT

A piston for an internal combustion engine comprises a skirt defining an inner space of the piston and having a skirt bottom; and a target arranged under the skirt bottom to engage with a passage detector arranged in the engine. The target is supported by a holding body held at least partially inside the inner space of the piston. The present disclosure likewise relates to an engine comprising such a piston.

16 Claims, 3 Drawing Sheets

(51) Int. Cl.
*F16J 1/04* (2006.01)
*F16J 1/16* (2006.01)
*G01D 5/14* (2006.01)

(56) References Cited

FOREIGN PATENT DOCUMENTS

DE     102015217152 A1 * 2/2017 .............. F01M 1/14
JP       2012-207642 A    10/2012

OTHER PUBLICATIONS

International Written Opinion for International Application No. PCT/FR2018/051238 dated Aug. 24, 2018, 5 pages.

* cited by examiner

PISTON FOR INTERNAL COMBUSTION ENGINE HAVING A TARGET, AND INTERNAL COMBUSTION ENGINE COMPRISING SUCH A PISTON

CROSS-REFERENCE TO RELATED APPLICATIONS

This application is a national phase entry under 35 U.S.C. § 371 of International Patent Application PCT/FR2018/051238, filed May 28, 2018, designating the United States of America and published as International Patent Publication WO 2018/220321 A1 on Dec. 6, 2018, which claims the benefit under Article 8 of the Patent Cooperation Treaty to French Patent Application Serial No. 1754682, filed May 29, 2017.

TECHNICAL FIELD

The present disclosure relates to a piston for an internal combustion engine. More specifically, it relates to a piston comprising a target designed to engage with a passage detector located in the cylinder housing of an engine. This type of piston can be used in the field of engines with variable compression ratios.

BACKGROUND

As a foreword, it is recalled that an internal combustion engine generally includes a combustion piston with a skirt to guide the piston in the cylinder, a connecting rod associated on its foot side with the piston pin and on its head side with a crankshaft bearing. These two bearings generally have parallel axes. The function of the rod is to transmit the translation movement of the piston from a "top dead center" to a "bottom dead center" as the crankshaft rotates.

It is generally agreed that adapting the compression rate of an engine to its load enables a great increase in the engine fuel efficiency. For example, it is sometimes desired to vary the compression ratio between about a value of 12 in the absence of load to a value of about 8 at full load.

It should also be recalled that the compression ratio of an internal combustion engine, often referred to as the compression rate, corresponds to the ratio of the volume of the combustion chamber when the piston is at the bottom dead center to the volume of the combustion chamber when the piston is at its top dead center.

Several solutions for adjusting the compression ratio and/or displacement of an internal combustion engine are known in the state of the art.

Whatever the solution implemented to allow this adjustment, it is often necessary to have the most direct possible measurement of the compression ratio, for example, at the level of a computer, to effectively control the engine. This information can be used, for example, to determine the precise time, or the angular offset, at which the spark plug in the engine combustion chamber must be turned on.

Solutions are therefore known that use a contactless position sensor, the sensor being fixedly placed on the cylinder housing and identifying the proximity of a target fixedly placed on the piston or the connecting rod. It can be a Hall effect sensor, in which case the target includes a magnetic element or a metallic mass. The signal delivered by the sensor can be analyzed, and its maximum indicates the time at which the target is positioned as close as possible to the sensor. A numerical model or pre-established tables can be used to determine the compression ratio by combining, for example, the information provided by the sensor with the angular position of the crankshaft. These solutions are known in particular, by DE102015217152, U.S. Pat. No. 4,407,155, DE102009013323 or JP2012207642.

The space defined by the cylinder housing in which different moving parts (crankshaft, pistons, connecting rods, etc.) are in motion is particularly limited. The additional elements that are placed in this volume (target, sensor, etc.) must be precisely arranged and configured so as not to interfere with the operation of the engine, while ensuring their functions with high reliability. In particular, the integration of additional elements that would modify the geometry of the cylinders and/or any machining that could damage a liner that can be fitted to these cylinders should be avoided.

BRIEF SUMMARY

In order to achieve one of these purposes, the present disclosure proposes a piston for an internal combustion engine, comprising a skirt defining an inner space of the piston and having a skirt bottom and a target arranged under the skirt bottom to cooperate with a passage detector arranged in the engine.

According to the present disclosure, the target is supported by a holding body held at least partially inside the inner space of the piston.

According to other advantageous and unrestrictive characteristics of the present disclosure, taken alone or in any technically feasible combination:
- the piston has a piston pin and the holding body is held by the piston pin;
- the holding body includes a flexible arm;
- the flexible arm includes a recess allowing the passage of the foot of a connecting rod;
- the flexible arm is in forced contact with an inner surface of the skirt in two support zones diametrically opposed to each other;
- the holding body is clipped onto the skirt bottom;
- the holding body and the skirt bottom are each equipped with a groove and/or an engaging spigot to allow them to be clipped;
- the skirt bottom is provided with at least one notch to receive the target;
- the target is a magnetic or metallic body.

In another aspect, the present disclosure proposes an internal combustion engine comprising a piston as described herein, a cylinder housing defining at least one cylinder and having at least one bore opening under the cylinder, and inserted into the bore, a measuring device comprising a passage detector, the target being arranged opposite the passage detector, when the piston is in the vicinity of the bottom dead center position.

According to other advantageous and unrestrictive characteristics of the present disclosure, taken alone or in any technically feasible combination:
- the bore is perpendicular to a crankshaft axis of the engine;
- the passage detector includes a Hall effect sensor;
- the engine has a variable compression ratio;
- the passage detector is located in a detection zone outside a zone swept by the skirt in the cylinder.

BRIEF DESCRIPTION OF THE DRAWINGS

Other characteristics and advantages of the present disclosure will emerge from the detailed description of embodi-

BRIEF DESCRIPTION OF THE DRAWINGS

Figure 1:
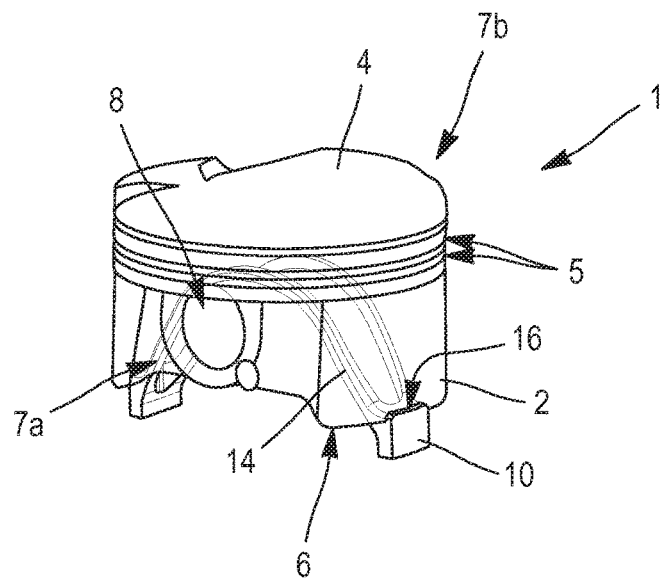
Figure 2:
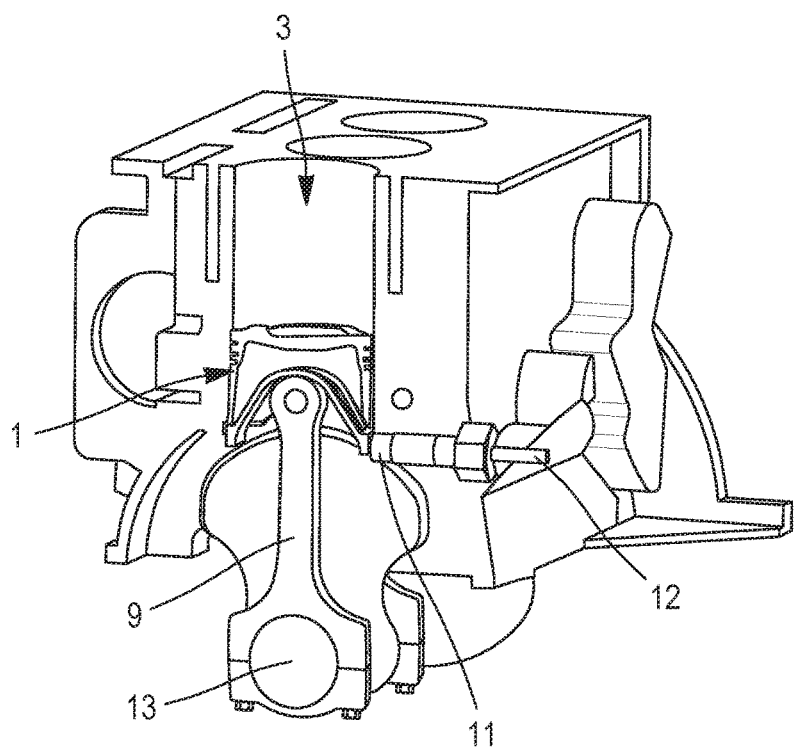

FIG. 1 shows a piston according to the present disclosure for an internal combustion engine;

FIG. 2 shows an internal combustion engine including the piston of FIG. 1.

Figure 3:
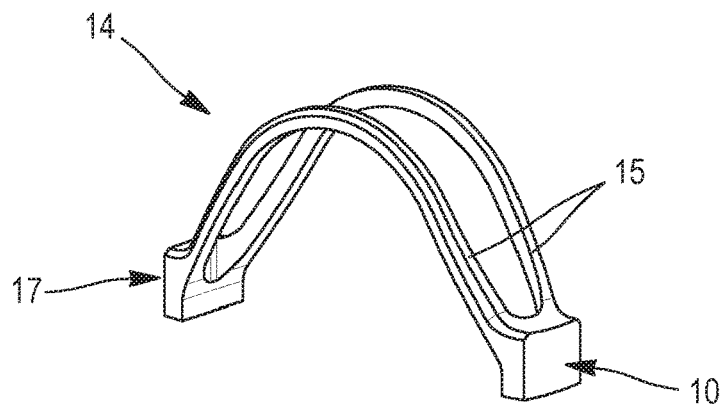

FIG. 3 shows a first embodiment of a body holding a target on the piston;

FIGS. 4a, 4b, 4c and 5 represent various embodiments of the holding body.

DETAILED DESCRIPTION

FIG. 1 shows a combustion piston 1, for an internal combustion engine, according to the present disclosure. FIG. 2 shows an internal combustion engine having the piston 1 of FIG. 1.

The piston 1 includes a skirt 2 defining an inner space of the piston 1, and allowing guiding the piston 1 in translation in a cylinder 3 of the engine. The piston 1 also has, in a very conventional way, a cap 4 and grooves 5 to support rings. In this disclosure, the free end of the skirt 2 (its edge), opposite the cap 4, will be referred to as the "skirt bottom 6". The skirt 2 can have a circular edge or section, or in a portion of a circle as shown in the example of FIG. 1. The skirt is equipped with two reinforced bosses 7a, 7b configured to retain a piston pin 8 to receive the foot of a connecting rod 9.

A piston 1 in conformity with the present disclosure also supports a target 10 placed under the skirt bottom 6, i.e., placed directly in contact with the edge of the skirt bottom 6. The target 10 may include a metallic and/or magnetic body, or, in general, be made of any material whose passage in the vicinity of a passage detector 11 located in the engine can be identified. This detector 11 may include a Hall effect sensor.

Of course, the target 10 is placed under the skirt bottom 6 so as not to interfere with the movement of the piston 1 from its top dead center to its bottom dead center during the repetition of the operating cycles. As such, it can be placed slightly set back from the skirt bottom 6, partly inside the inner space of the piston 1.

As shown in FIG. 2, the positioning of the target 10 under the skirt bottom 6 is particularly advantageous, in that it allows the detector 11 to be placed directly under the combustion cylinder 3. More specifically, the cylinder housing defining the cylinder 3 has a bore, opening under the cylinder 3, into which a measuring device 12 with the passage detector 11 can be inserted.

This configuration allows the target 10 to be placed opposite the passage detector 11 when the piston 1 is in the bottom dead center position, or in a position close thereto. This avoids having the bore opening directly into the cylinder 3, which would have been necessary if the target 10 had been supported by the piston 1 itself. Such machining is likely to damage the inner surface of the cylinder 3 and affect the engine performance, especially when the cylinder 3 has a liner integrated or inserted upon casting. In other words, the detection zone in which the passage detector 11 is located is outside the zone swept by the skirt in the cylinder liner 3.

In addition, this configuration makes it possible to obtain a very direct, and therefore accurate, measurement of the position of the piston 1 without interfering with the operation of the engine, which would have been more difficult to obtain by having the target 10 supported by the connecting rod 9.

Advantageously, to facilitate its machining, the bore formed in the cylinder housing can be perpendicular to the crankshaft main axis 13.

The positioning of the target 10 under the skirt bottom 6 combined with the positioning of the detector 11 under the cylinder 3 appear very advantageous. However, this configuration requires that the target 10 should be rigidly fixed to the piston 1 without affecting its operation or geometry. This can be difficult to achieve when the target 10 is assembled directly by screwing, gluing or insertion upon casting on the piston 1. The present disclosure then cleverly provides for the target 10 to be supported by a holding body 14 held at least partially inside the inner space of the piston 1.

FIG. 3 illustrates a first embodiment of the holding body 14. In this mode of implementation, the holding body 14 includes a flexible arm 15 at one end of which is attached the target 10, or a support for such a target 10. An end piece 17 can be placed at the other end of the flexible arm 15 to give the holding body 14 a symmetrical appearance and facilitate its assembly to the piston 1.

As shown in FIG. 1, the holding body 14 is assembled to the piston 1 in this embodiment by having the flexible arm 15 supported by the piston pin 8, and forming two support zones on the skirt bottom 6, diametrically opposed to each other. The flexible arm 15 can be equipped with a central recess allowing the passage of the foot of the connecting rod 9. The ends of the flexible arm 15 are in forced support on the inner surface of the skirt 2, at the support zones, so as to place the target 10 under the skirt bottom 6. To allow the position of the target 10 to be adjusted and to allow any movement of the holding body 14 to be blocked, the skirt bottom 6 may be fitted with at least one notch 16 in which the target 10 and/or the end piece 17 can be placed.

Figure 4A:
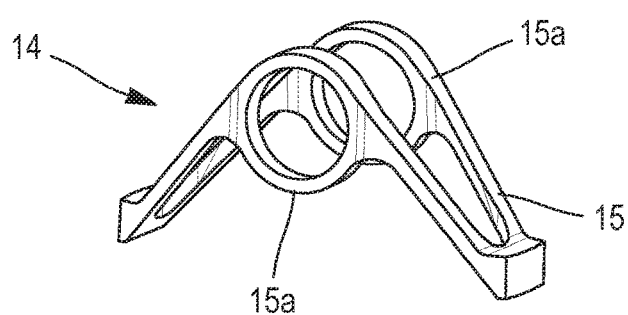
Figure 4B:
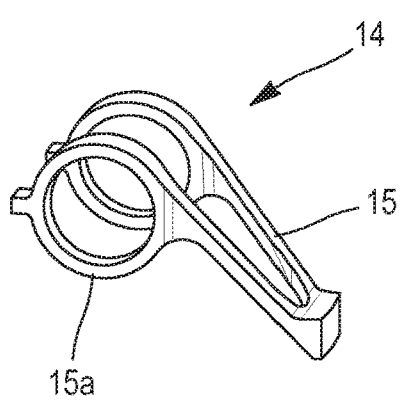
Figure 4C:
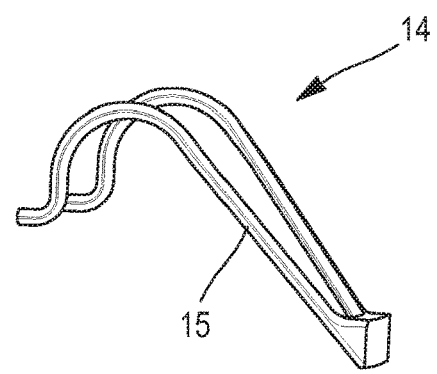

FIGS. 4a, 4b and 4c show other embodiments of the holding body 14. In FIG. 4a, the flexible arm 15 is equipped with a central washer 15a allowing the holding forces to be absorbed by the piston pin 8.

In FIGS. 4b and 4c, the holding body 14 has an asymmetrical shape, with and without a central washer 15a, respectively. In these modes of implementation, the holding body 14 is supported in a single support zone of the inner surface of the skirt bottom 6.

Figure 5:
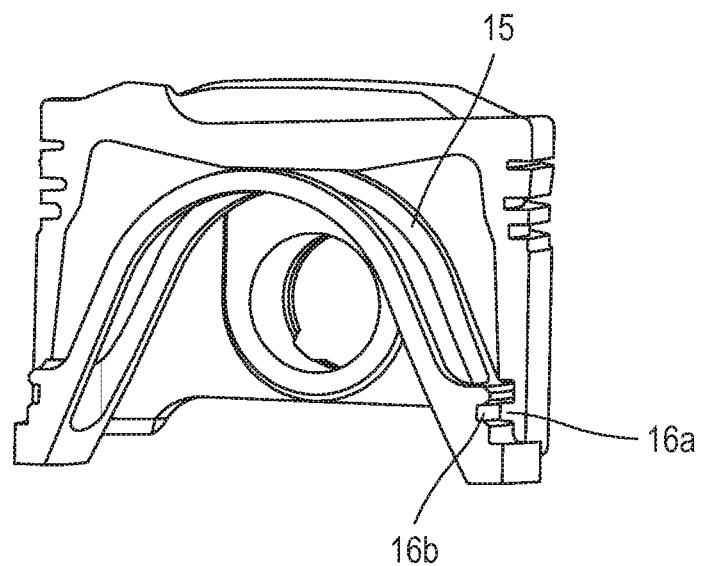

FIG. 5 shows one particularly advantageous embodiment of the present disclosure. In this embodiment, the flexible arm 15 and the skirt bottom 6 are clipped together, at least in a support zone. For this purpose, at least one end of the flexible arm 15 and the inner surface of the skirt, at the skirt bottom 6, are each provided with a groove 16b and/or a spigot 16a whose shapes engage together to allow this clipping. Thus, the holding body 14 does not require the presence of the piston pin to be held in place, which helps to facilitate its assembly.

In this embodiment, as in all the control modes described so far, notches 16 can be provided at the skirt bottom 6 to block any movement of the holding body 14. The flexible arm 15 can include a recess to free a passage for the foot of the connecting rod. In this last embodiment, the holding being ensured by the clipping mechanism, it is not necessary for the flexible arm 15 to be flexible to ensure the forced support of the holding body 14 against the inner surface of the piston.

Of course, the present disclosure is not limited to the embodiments described and alternative embodiments can be provided within the scope of the invention as defined by the claims.

The invention claimed is:

1. A piston for an internal combustion engine, comprising:
   a skirt defining an inner space of the piston and having a skirt bottom; and
   a target arranged under the skirt bottom to engage with a passage detector arranged in the engine, the target being supported by a holding body held at least partially inside the inner space of the piston, wherein the holding body comprises an arm provided with a recess allowing passage of a foot of a connecting rod.

2. The piston of claim 1, further comprising a piston pin, wherein the holding body is held by the piston pin.

3. The piston of claim 2, wherein the arm is flexible.

4. The piston of claim 3, wherein the flexible arm is in forced contact with an inner surface of the skirt in two support zones diametrically opposed to each other.

5. The piston of claim 1, wherein the holding body is clipped onto the skirt bottom.

6. The piston of claim 5, wherein the holding body comprises one of a groove and a spigot, and the skirt bottom comprises the other of the groove and the spigot, the groove and spigot configured to engage one another.

7. The piston of claim 1, wherein the skirt bottom includes at least one notch configured to receive the target therein.

8. The piston of claim 1, wherein the target comprises a magnetic or metallic body.

9. An internal combustion engine, comprising:
   a piston according to claim 1;
   a cylinder housing defining at least one cylinder and having at least one bore opening under the cylinder; and
   a measuring device inserted in the at least one bore, the measuring device comprising a passage detector, the target being arranged opposite the passage detector when the piston is in the vicinity of a bottom dead center position.

10. The internal combustion engine of claim 9, wherein the at least one bore is perpendicular to a crankshaft axis of the engine.

11. The internal combustion engine of claim 10, wherein the passage detector includes a Hall effect sensor.

12. The internal combustion engine of claim 9, wherein the engine has a variable compression ratio.

13. The internal combustion engine of claim 9, wherein the passage detector is located in a detection zone outside a zone swept by the skirt in the cylinder.

14. The internal combustion engine of claim 9, wherein the passage detector includes a Hall effect sensor.

15. The piston of claim 1, wherein the arm is flexible.

16. The piston of claim 15, wherein the flexible arm is in forced contact with an inner surface of the skirt in two support zones diametrically opposed to each other.

* * * * *